United States Patent Office 3,226,186
Patented Dec. 28, 1965

3,226,186
METHOD OF OBTAINING PURE ALUMINUM AMMONIUM ALUM
Stanislaw Bretsznajder, Janusz Porowski, and Jan Lis, Warsaw, Poland, assignors to Instytut Chemii Ogolnej, Warsaw, Poland
No Drawing. Filed July 3, 1962, Ser. No. 207,378
Claims priority, application Poland, July 14, 1961, P 96,951
3 Claims. (Cl. 23—118)

Aluminum alum having a high degree of purity is used for a number of purposes. For instance, in the production of aluminum oxide worked up into synthetic stones, e.g. monocorundum, aluminum ammonium alum free from admixtures of compounds of heavy metals such as iron, manganese, lead, copper, tin, etc., is necessary. These metals which are contained in the raw materials or which penetrate in small quantities from the apparatus in which the aluminum ammonium alum is produced, always contaminate the technical product. At present several methods are used of obtaining pure aluminum ammonium alum.

One of these methods consists in producing aluminum ammonium alum from very pure raw materials. In this method aluminum hydroxide, obtained according to Bayer's method from sodium aluminate hydrolysis, is dissolved in pure sulphuric acid obtained by contact process whereupon chemically pure ammonium sulphate is added and the solution is left for crystallization of alum. However it is known from practice, that aluminum hydroxide as well as sulphuric acid, always contains small quantities of ferric salt, which contaminates the crystallized alum. Moreover, this method is very expensive owing to the necessity of using very pure reagents.

Another method of producing pure aluminum ammonium alum which is used in the industry consists in a repeated crystallization of technical alum. Since the crystallization is carried out 4 times and the yield of each of them is about 70%, the final yield in relation to the starting raw materials amounts only to 25%. In this method the fraction of postcrystallization liquors are not returned to the circulation owing to contaminations accumulated in them. This method is expensive and one does not obtain a product quite free from iron, due to the isomorphism of aluminum ammonium alum and other alums.

The above mentioned difficulties indicate that both of the said methods, though used in the industry, can not be considered a good technological solution.

In the technical literature and patents numerous proposals are also given, recommending application of chemical reagents to precipitate iron, copper and lead compounds, etc., from the aluminum salts solutions. Particularly ferrocyanides, ferricyanides, hydroxides or sulphides have been suggested as reagents precipitating contaminations in the form of non-soluble sediments. In practice this method is quite unsuccessful because ferrocyanides, ferricyanides, sulphides, hydroxides of heavy metals precipitate in the colloidal form. Filtering off the suspension from the solution is not possible in this case because the colloids pass through all kinds of filter fabrics which are used in industrial devices. In this connection the method of precipitating compounds of heavy metals from concentrated solutions of aluminum salts has not proved practical.

At present it has been proved that it is possible to overcome the described difficulties according to the invention, as starting raw material is used cheap technical aluminum ammonium alum solution obtained from aluminum sulfate and ammonium sulfate and containing a small quantity of crumbled silica. The quantity of silica is at least so much that after addition of ammonium sulphate in order to obtain alum, the quantity of $SiO_2$ in the solution amounts at least to 0.003% by weight. To a solution of this aluminum ammonium alum is added ammonium sulfide solution in a quantity at least equal to that which is theoretically required for precipitating compounds of heavy metals. Under these conditions there takes place a complete reduction of ferric sulphate contained as a contamination to ferrous sulphate, partial oxidation of the sulphide ions to colloidal sulphur, and simultaneous precipitation of the sulphides of heavy metals. In this method, in contradistinction to the above described known methods according to which the sediments precipitate in a colloidal form, coagulation of the suspension takes place owing to the presence of small quantities of silica. Coarse suspension particles are formed which can be filtered off or can be separated from the alum solution in any other known manner without any difficulty. The alum solution after separation of the precipitated suspension is crystallized. It must be stressed, that an equally essential condition in obtaining pure aluminum ammonium alum is a complete reduction of trivalent iron to bivalent iron, because in the presence of trivalent iron compounds, iron remains in the lattice of alum crystals and contaminates the product.

In the method according to the invention coagulation of the suspension takes place not only in the case of alum obtained from the solution prepared from aluminum sulphate contaminated by silica and ammonium sulphate, but also in the case of the solution of fused alum crystals contaminated by silica.

By the method according to the invention pure aluminum ammonium alum is also obtained from previously prepared technical aluminum ammonium alum, which either does not contain any, or contains insufficient quantity, of silica. If, according to the invention, to the solution of this alum are added crumbled silica ($SiO_2$) in the quantity of at least 0.003% and then ammonium sulphide, the contaminants are precipitated and separated from the solution.

*Example.*—20 kg. of technical aluminum sulphate containing 14.3% of $Al_2O_3$ was dissolved in water, obtaining 50 litres of the solution. This solution contained in one litre 0.34 g. of silica ($SiO_2$) in the form of fine suspension. $SiO_2$ suspension came from clay used as a raw material for obtaining technical aluminum sulphate. 3.8 kg. of technical ammonium sulphate was added to the solution. An analysis showed that the obtained aluminum ammonium alum solution contained in one litre:

2.46 g. of ferric sulphate $Fe_2(SO_4)_3$
0.22 g. of copper sulphate $CuSO_4$
0.18 g. of lead sulphate $PbSO_4$
0.3 g. of manganese sulphate $MnSO_4$
0.02 g. of zinc sulphate $ZnSO_4$ The solution was divided into two parts.
(a) To the first part of the solution was added 0.2 litre of the ammonium sulphide solution, prepared by saturation with hydrogen sulphide of concentrated ammonia water (containing about 50 g. of ammonium sulphide). The reaction between heavy metals compounds contaminating the solution and ammonium sulphide was carried on for 1 hour at a temperature of 82° C., in a hermetically closed vessel, with vigorous stirring of the liquid. Subsequently the solution was filtered in a heated press filter through a cloth, on which filter paper was placed. By slowly mixing, the filtrate was cooled to a temperature of 24° C. The precipitated crystalline alum was separated from the remaining solution by means of centrifuge and washed with 2 litres of cold water. 9.72 kg. of aluminum ammonium alum was obtained, which corresponds to the 76% yield, calculated in relation to the quantity of aluminum sulphate used.

The alum crystals obtained were snow-white and contained:

| | Percent by weight |
|---|---|
| Fe | $2.10^{-4}$ |
| Cu | $4.10^{-6}$ |
| Pb | Not found |
| Zn | Not found |
| Mn | Not found |

Thus the product obtained is very pure.

(b) The second part of the solution—in order to prove that the crumbled silica, contained in the aluminum sulphate, is of a real importance in removing contaminations (of heavy metals)—was submitted, prior to treatment, to a thorough filtration in a press filter through a filter cloth and paper. The obtained, quite clear, filtrate, free from silica, was submitted to treatment exactly in the same manner as the first part of the solution had been worked out. Almost the same quantity (by weight) of aluminum ammonium alum crystals was obtained, namely 9.64 kg. i.e. yield 75.9%.

The alum was of a gray colour and contained:

| | Percent by weight |
|---|---|
| Fe | $7.5.10^{-4}$ |
| Cu | $3.2.10^{-3}$ |
| Pb | $4.10^{-3}$ |
| Mn | $1.2.10^{-4}$ |
| Zn | Not found |

From comparison of (a) and (b) samples analysis it can be seen that precipitation from alum solution of heavy metals sediment in the presence of silica suspension enables very pure alum to be obtained, which cannot be achieved by submitting to treatment without silica.

What we claim is:

1. A method for the preparation of substantially pure aluminum ammonium alum which comprises treating an aqueous solution of technical grade aluminum ammonium alum, which contains in addition to undesirable metal compound impurities at least 0.003% by weight of $SiO_2$ based on the weight of the solution, with ammonium sulfide in an amount not less than the theoretical amount necessary for the precipitation of the metal compounds, said treatment causing the precipitation and coagulation of the metal compound impurities, separating the precipitated and coagulated suspension from the solution, and crystallizing the substantially pure aluminum ammonium alum from the solution.

2. A method as claimed in claim 1 wherein the aqueous solution of technical grade aluminum ammonium alum is formed by combining aqueous technical aluminum sulfate with technical ammonium sulfate.

3. A method as claimed in claim 1 wherein preformed technical aluminum ammonium alum is employed to which is added a sufficient amount of crumbled $SiO_2$ prior to the addition of the ammonium sulfide.

References Cited by the Examiner

UNITED STATES PATENTS

| 245,750 | 8/1881 | Semper | 23—123 |
| 914,187 | 3/1909 | Rinman | 23—118 |

MAURICE A. BRINDISI, *Primary Examiner.*